(12) United States Patent
Zhang

(10) Patent No.: US 11,363,915 B2
(45) Date of Patent: Jun. 21, 2022

(54) CONTACT BAKING MECHANISM OF A TOASTER

(71) Applicant: ZHEJIANG JIU KANG ELECTRIC APPLIANCES CO., LTD., Jiaxing (CN)

(72) Inventor: Guangli Zhang, Jiaxing (CN)

(73) Assignee: ZHEJIANG JIU KANG ELECTRIC APPLIANCES CO., LTD., Jiaxing (CN)

( * ) Notice: Subject to any disclaimer, the term of this patent is extended or adjusted under 35 U.S.C. 154(b) by 79 days.

(21) Appl. No.: 16/886,965

(22) Filed: May 29, 2020

(65) Prior Publication Data

US 2020/0375397 A1 Dec. 3, 2020

(30) Foreign Application Priority Data

Jun. 3, 2019 (CN) .......................... 201910476523.6

(51) Int. Cl.
*A47J 37/08* (2006.01)

(52) U.S. Cl.
CPC ....... *A47J 37/0807* (2013.01); *A47J 37/0857* (2013.01); *A47J 37/0871* (2013.01)

(58) Field of Classification Search
CPC .... A47J 37/0611; A47J 37/0718; A47J 37/08; A47J 37/0807; A47J 37/0814; A47J 37/0821; A47J 37/0835; A47J 37/0842; A47J 37/085; A47J 37/0857; A47J 37/0871; A47J 37/0878
USPC ................... 99/385–387, 389–393, 401, 402
See application file for complete search history.

(56) References Cited

U.S. PATENT DOCUMENTS

| | | | | |
|---|---|---|---|---|
| 5,006,690 A | * | 4/1991 | Cole ....................... | A47J 37/08 219/385 |
| 5,924,355 A | * | 7/1999 | Belknap .............. | A47J 37/0814 99/385 |
| 6,267,044 B1 | * | 7/2001 | Friel, Sr. ............. | A47J 37/0814 99/385 |
| 2003/0159594 A1 | * | 8/2003 | Tan ...................... | A47J 37/0857 99/385 |
| 2005/0204927 A1 | * | 9/2005 | Boyle ................. | A47J 37/0857 99/389 |
| 2014/0352549 A1 | * | 12/2014 | Upston ............... | A47J 37/0857 99/386 |

FOREIGN PATENT DOCUMENTS

CN 206080265 U * 4/2017

* cited by examiner

*Primary Examiner* — Hung D Nguyen
(74) *Attorney, Agent, or Firm* — RatnerPrestia

(57) ABSTRACT

A contact baking mechanism of a toaster comprises a baking tray, a fixed bracket, and a mobile mechanism. The baking tray is provided in the fixed bracket and includes a left baking tray and a right baking tray. The mobile mechanism includes a bread tray and a mobile bracket. The bread tray is provided between the left baking tray and the right baking tray, and one end of the bread tray is clamped in the fixed bracket through a T-shaped groove. The mobile bracket is provided outside the fixed bracket and fixedly connected with the bread tray. The left and right baking trays are moved back and forth by an elastic mechanism when the bread tray moves up and down along the T-shaped groove.

17 Claims, 8 Drawing Sheets

CONTACT BAKING MECHANISM OF A TOASTER

TECHNICAL FIELD

The present invention relates to a baking mechanism, in particular relates to a contact baking mechanism of a toaster.

BACKGROUND

The baking mechanism of a toaster in the prior art, in which the heating wire used in the heating mechanism is directly wound and fixed on the mica sheet, and the heating wire is electrified and heated through the circuit control, so as to bake the package sheet. Due to the fixed installation of the heating mechanism, there is a certain gap between the heating mechanism and the bread slice support, which cannot be directly contacted for heating, and the heating efficiency is low, resulting in a long time for baking bread (about 2 minutes to 6 minutes). When the bread slices are baked for a long time, the moisture contained in them will evaporate a lot, which will affect the taste of the food. Therefore, the prior art needs to be improved.

SUMMARY

The technical problem to be solved by the present invention is to provide a contact baking mechanism of a toaster, solving the problem of low baking efficiency and long heating time affecting the taste of food.

The technical problem to be solved by the present invention is to provide a contact baking mechanism of a toaster, comprising a baking tray, a fixed bracket and a mobile mechanism, the baking tray is provided in the fixed bracket, the baking tray comprising a left baking tray and a right baking tray, the mobile mechanism comprising a bread tray and a mobile bracket, the bread tray is provided between the left baking tray and the right baking tray, the end of the bread tray is clamped in the fixed bracket through a T-shaped groove, the mobile bracket is provided outside the fixed bracket and fixedly connected with the bread tray, the left baking tray and the right baking tray are moved back and forth by the elastic mechanism when the bread tray moves up and down along the T-shaped groove.

Preferably, the baking trays are two sets and are provided in parallel in a fixed bracket, each group of baking trays comprising a left baking tray and a right baking tray, the fixed bracket comprising a front bracket, a back bracket, a left bracket and a right bracket, the structure of the front bracket and the back bracket have the same structure and are provided symmetrically, the left bracket and the right bracket have the same structure and are provided symmetrically; the bread trays are two sets and are clamped between the front bracket and the back bracket through a T shaped-groove, the bread trays are correspondingly provided with the baking trays, the mobile bracket is provided outside the front bracket, the elastic mechanism comprising a wire spring and a tension spring.

Preferably, a hanging pin is provided at both ends of the top and bottom of the baking trays, a moving hole of the hanging pin matching with the hanging pin is provided on the front bracket and the back bracket, the hanging pin is provided in the moving hole of the hanging pin, one end of the two staggered ends of the wire spring is fixed on the hanging pin on the top of the left baking tray, and the other end is fixed on the corresponding hanging pin on the right baking tray, the wire spring is clamped outside the front bracket or the back bracket through the fixed buckle and the buttress post.

Preferably, the fixed buckles are symmetrically provided on both sides of the T-shaped groove, the buttress posts are symmetrically provided on both sides of the T-shaped groove and above the fixed buckle, the wire spring is pressed to deform and generate tension when the bread trays move downward.

Preferably, the tension spring is provided outside the front bracket or the back bracket, one end of the tension spring is fixed on the hanging pin of the left baking tray, and the other end is fixed on the hanging pin corresponding to the right baking tray.

Preferably, the front bracket and the back bracket are connected at the top by the upper bracket and the lower bracket at the bottom, the left bracket and the right bracket are L-shaped, a guide groove perpendicular to the baking trays is provided between the bottom ends of the lower bracket, the left bracket and the right bracket, the center of the bottom of the baking trays are provided with a guide post matched with the guide groove, and the baking tray moves along the guide groove through the guide post.

Preferably, a guide post is provided in the middle part of the outer side of the fixed bracket, the mobile bracket is clamped on the guide post, a limit spring is provided on the guide post, the limit spring is provided above the mobile bracket, a return spring is provided above the mobile bracket, one end of the return spring is fixed on the mobile bracket and the other end is fixed on the top of the front bracket.

Preferably, a flip handle is provided on the mobile bracket which is driven to move by the flip handle.

Preferably, the mobile bracket is connected with a drive motor, and the mobile bracket is driven to move by the rotation of the drive motor.

Preferably, a top cover is provided on the top of the fixed bracket, a bread entrance is provided at the corresponding position of the baking trays on the top cover (20).

Preferably, an aluminum sheet is adopted as the base material by the left baking tray and/or right baking tray, the aluminum sheet is sprayed Teflon coating or ceramic coating on one side facing the food, and the other side is brazed the heating pipe which is provide with terminal blocks at the two ends, support rods are provided on the aluminum sheet, the support rods are bent at the end to form hanging pins.

Preferably, the left baking tray and/or the right baking tray are made of glass ceramics or metal plate as the base material, a febrile membrane is printed on the back of the glass ceramics or the metal plate to the side of the food, and the metal plate is sprayed Teflon coating or ceramic coating on one side facing the food.

Compared with the prior art, the beneficial effects of the present invention are as follows: the movable baking tray for direct contact baking in the present invention, which has high heating efficiency and energy saving; the structure is simple to using the spring to drive the baking tray to clamp the bread slice; compared with the fixed indirect non-contact baking, the time required for baking the bread slice is greatly shortened, the energy is saved, the evaporation of water in the bread slice is reduced, and the taste of the edible bread slice is improved.

DETAILED DESCRIPTION

The invention will now be further described below with reference to the accompanying drawings and examples.

Figure 1:
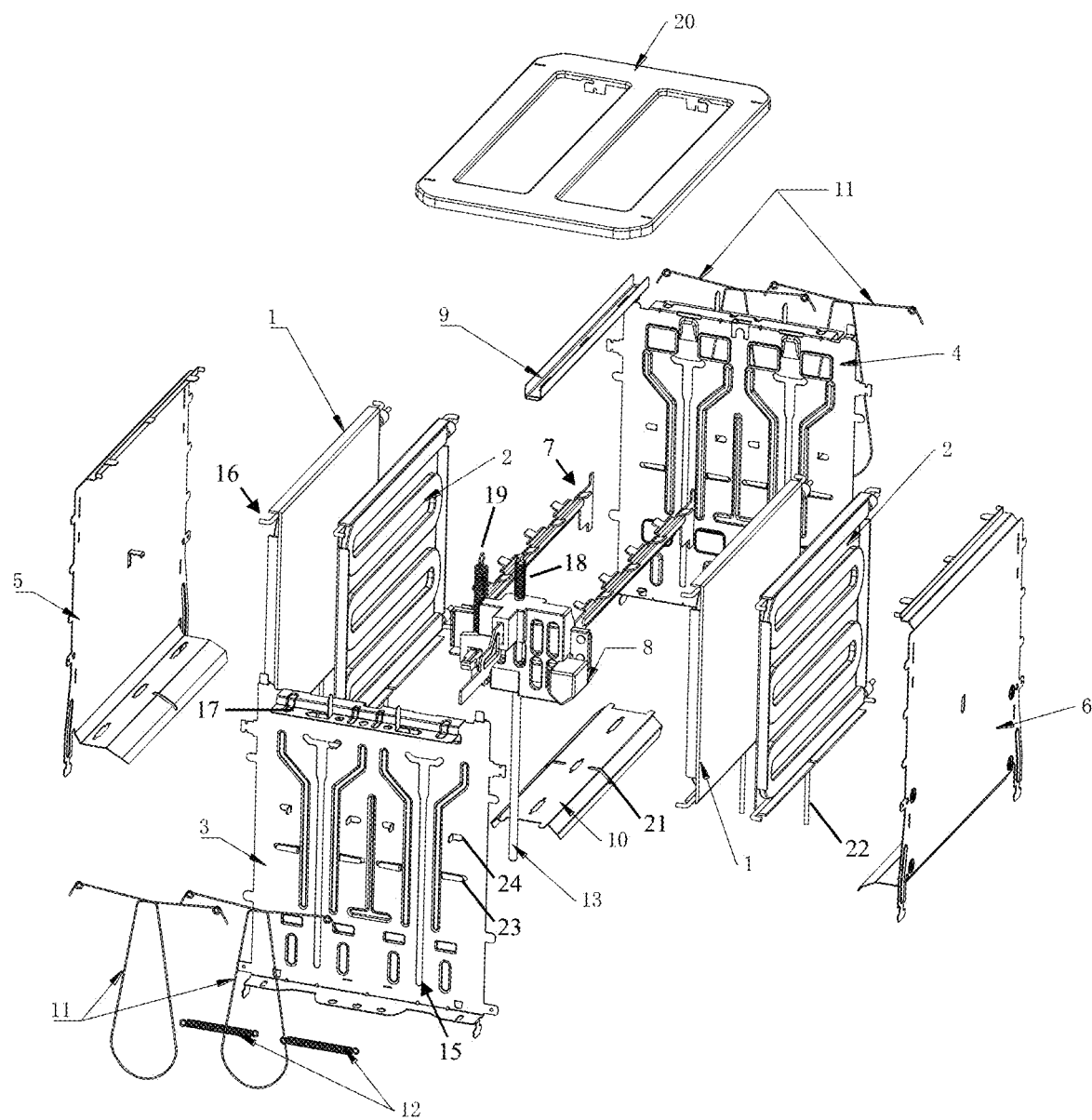
FIG. 1 is an exploded view illustrating the structure of a handle for a contact baking mechanism of a toaster according to one embodiment of this invention.

FIG. 1 is an exploded view illustrating the structure of a handle for a contact baking mechanism of a toaster according to one embodiment of this invention.

Please refer to FIG. 1, a contact baking mechanism of a toaster of one embodiment of the present invention, comprising a baking tray, a fixed bracket and a mobile mechanism, the baking trays are two sets and are provided in parallel in a fixed bracket, each group of baking trays comprising a left baking tray 1 and a right baking tray 2, the fixed bracket comprising a front bracket 3, a back bracket 4, a left bracket 5 and a right bracket 6, the structure of the front bracket 3 and the back bracket 4 have the same structure and are provided symmetrically, the left bracket 5 and the right bracket 6 have the same structure and are provided symmetrically. The mobile mechanism comprising bread trays 7 and mobile bracket 8. The bread trays 7 are two sets and are clamped between the front bracket 3 and the back bracket 4 through a T shaped-groove 15 and between the left baking tray 1 and the right baking tray 2. The mobile bracket 8 is provided outside the front bracket 3 and fixed connected with the bread trays 7. The bread tray 7 drives the left baking tray 1 and the right baking tray 2 to reciprocate through the wire spring 11 and the tension spring 12 when the mobile bracket 8 drives the bread tray 7 to move up and down.

Specifically, the contact baking mechanism of the toaster of one embodiment of the present invention, the front bracket 3 and the back bracket 4 are connected at the top by the upper bracket, the front bracket 3 and the back bracket 4 are connected at the bottom by the lower bracket 10. The left bracket 4 and the right bracket 5 are L shaped. A guide groove 21 which is perpendicular to the bake tray is provided at the middle of the bottom of the lower bracket 10, the left bracket 5 and the right bracket 6. A guide post 22 which is matched with the guide groove 21 is provided at the middle of the bottom of the baking tray, the baking tray moves along the guide groove 21 through the guide post.

Specifically, the contact baking mechanism of the toaster of one embodiment of the present invention, a hanging pin 16 is provided at both ends of the top and bottom of the baking trays, a moving hole of the hanging pin 17 matching with the hanging pin 16 is provided on the front bracket 3 and the back bracket 4. The hanging pin 16 is connected with the wire spring 11 through the hanging pin 17. One end of the two staggered ends of the wire spring 11 is fixed on the hanging pin 16 on the top of the left baking tray 1, and the other end is fixed on the corresponding hanging pin 16 on the right baking tray 2, the wire spring is clamped on the front bracket 3 or the back bracket 4 through the fixed buckle 23 and the buttress post 24.

Specifically, the contact baking mechanism of the toaster of one embodiment of the present invention, two T-shaped grooves 15 are provided on the front bracket 3 and the back bracket 4 in parallel. The two T-shaped grooves 15 are perpendicular to moving hole of the hanging pin 17, and is located in the middle of the two moving hole of the hanging pins 17 corresponding to the same baking tray. The fixed buckle 23 is symmetrically provided on both sides of the T-shaped groove 15, and the buttress post 24 is symmetrically provided on both sides of the T-shaped groove 15 and above the fixed buckle 23. The tension spring is located on the outside of the front bracket 3 or the back bracket 4, one end of the tension spring 12 is fixed on the hanging pin 16 of the left baking tray 1, and the other end is fixed on the hanging pin 16 corresponding to the right baking tray 2. When the bread tray 7 moves down to the compress the wire spring 11, the wire spring 11 deforms to produce tension. Under the action of tension, the left baking tray 1 and the right baking tray 2 move to the clamping state along the guide groove 21, at this time, the tension spring 12 is compressed by the left baking tray 1 and the right baking tray 2. The bread tray 7 moves upward, the wire spring 11 returns to the relaxed state, and the left baking tray 1 and the right baking tray 2 are pushed away by the pressure of the tension spring 12 to return to the separated state. The invention realizes up and down independent adjustment through the cooperation of wire spring 11 and tension spring 12, so that the clamping force can be flexibly adjusted according to the thickness of food (mainly bread), so as to realize flexible clamping and avoid serious deformation of food due to clamping.

Specifically, the contact baking mechanism of the toaster of one embodiment of the present invention, a guide post 13 is provided on the middle part of the outer side of the front bracket 3, the mobile support 8 is clamped on the guide post 13, a limit spring 18 is provided on the guide post 13, the limited spring 18 is provided above the mobile bracket 8, a return spring 19 is provided on the mobile bracket 8, one end of the return spring 19 is fixed on the mobile bracket 8, and the other end is fixed on the top of the front bracket 3. The mobile bracket 8 moves down the guide postr 13, and the return spring 19 is in the stretching state. Releasing the mobile bracket 8, the pull force of the return spring 19 drives the mobile bracket 8 to move up, the limit spring 13 limits the position of the mobile bracket 8 to move up, and the mobile bracket 8 returns to its original position.

Preferably, a flip handle 25 is provided on the mobile bracket (8) which is driven to move by the flip handle 25. Or the mobile bracket 8 is connected with a drive motor, and the mobile bracket 8 is driven to move by the rotation of the drive motor, so as to realize the automation of the up and down movement of the mobile bracket 8.

Specifically, the contact baking mechanism of the toaster of one embodiment of the present invention, a top cover 20 is provided on the top of the fixed bracket, a bread entrance is provided at the corresponding position of the baking trays on the top cover 20.

Figure 2:
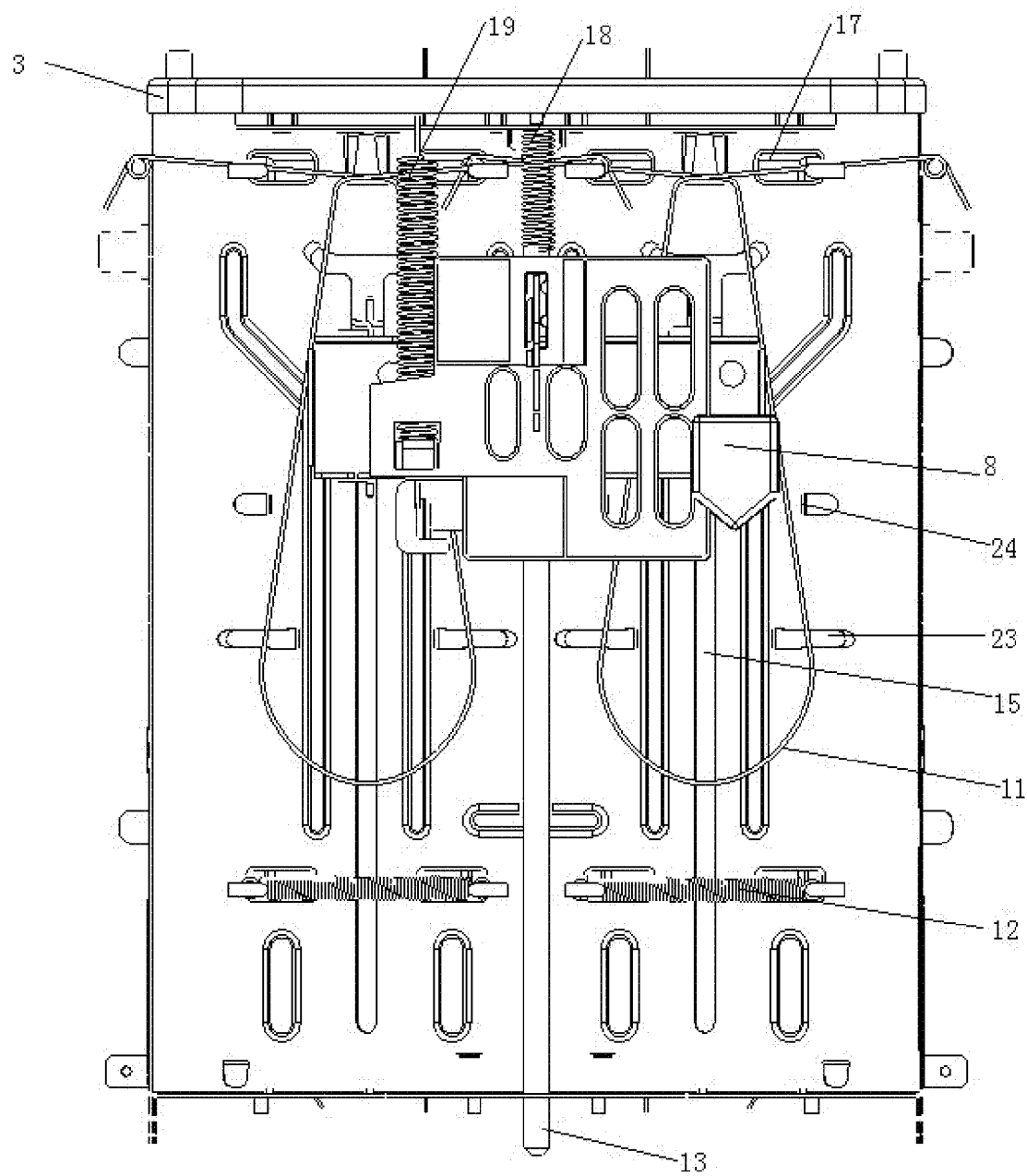
FIG. 2 is a front view illustrating the non-operating and releasing state of a handle for a contact baking mechanism of a toaster according to one embodiment of this invention.
Figure 3:
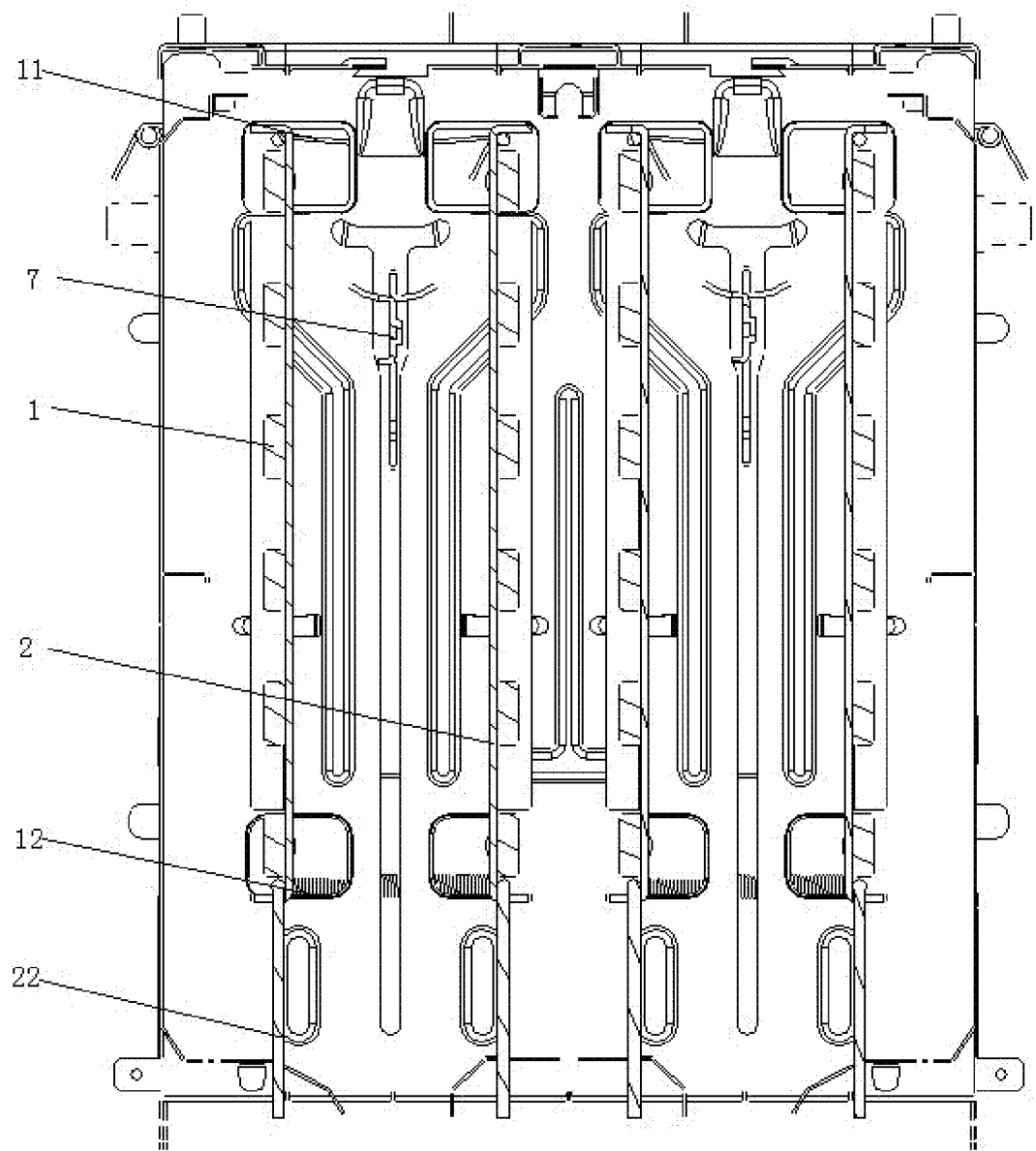
FIG. 3 is a front cross-sectional view illustrating the non-operating and releasing state of a handle for a contact baking mechanism of a toaster according to one embodiment of this invention.
Figure 4:
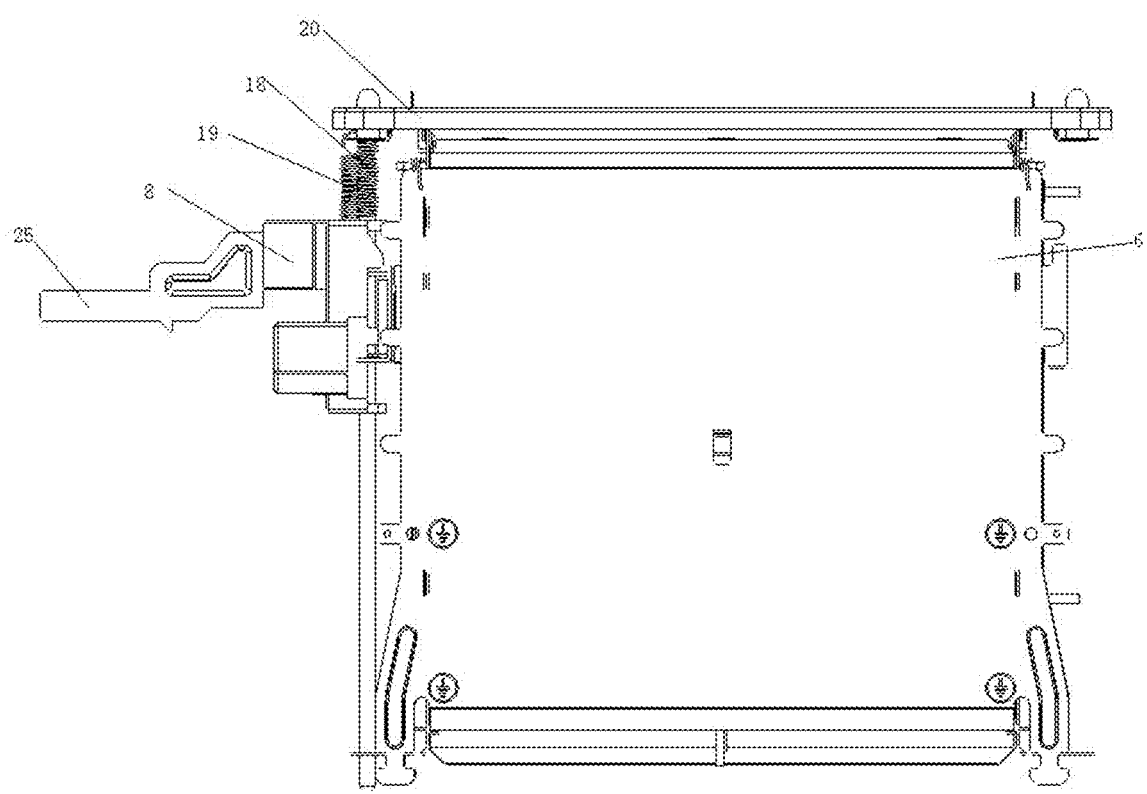
FIG. 4 is a side view illustrating the non-operating and releasing state of a handle for a contact baking mechanism of a toaster according to one embodiment of this invention.
Figure 5:
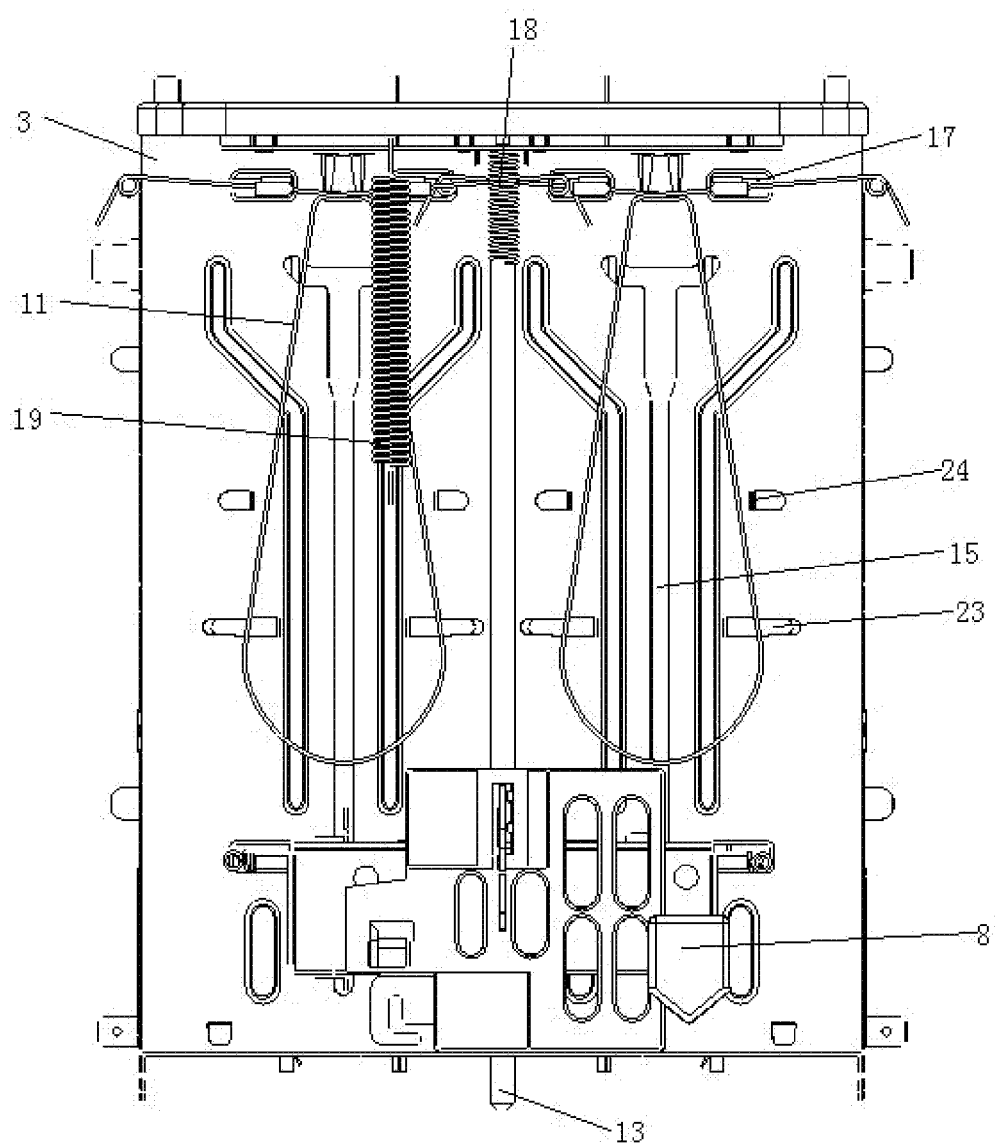
FIG. 5 is a front view illustrating the clamping working state of a handle for a contact baking mechanism of a toaster according to one embodiment of this invention.
Figure 6:
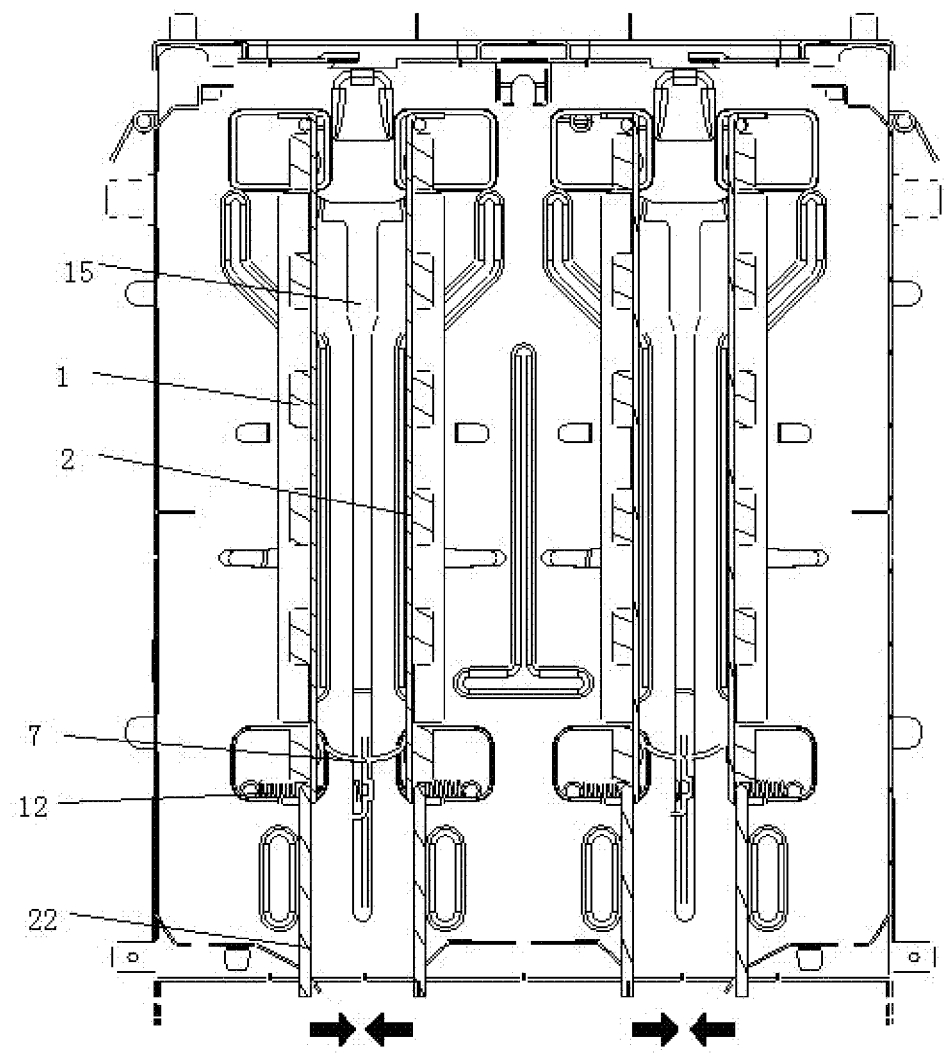
FIG. 6 is a front cross-sectional view illustrating the clamping working state of a handle for a contact baking mechanism of a toaster according to one embodiment of this invention.
Figure 7:
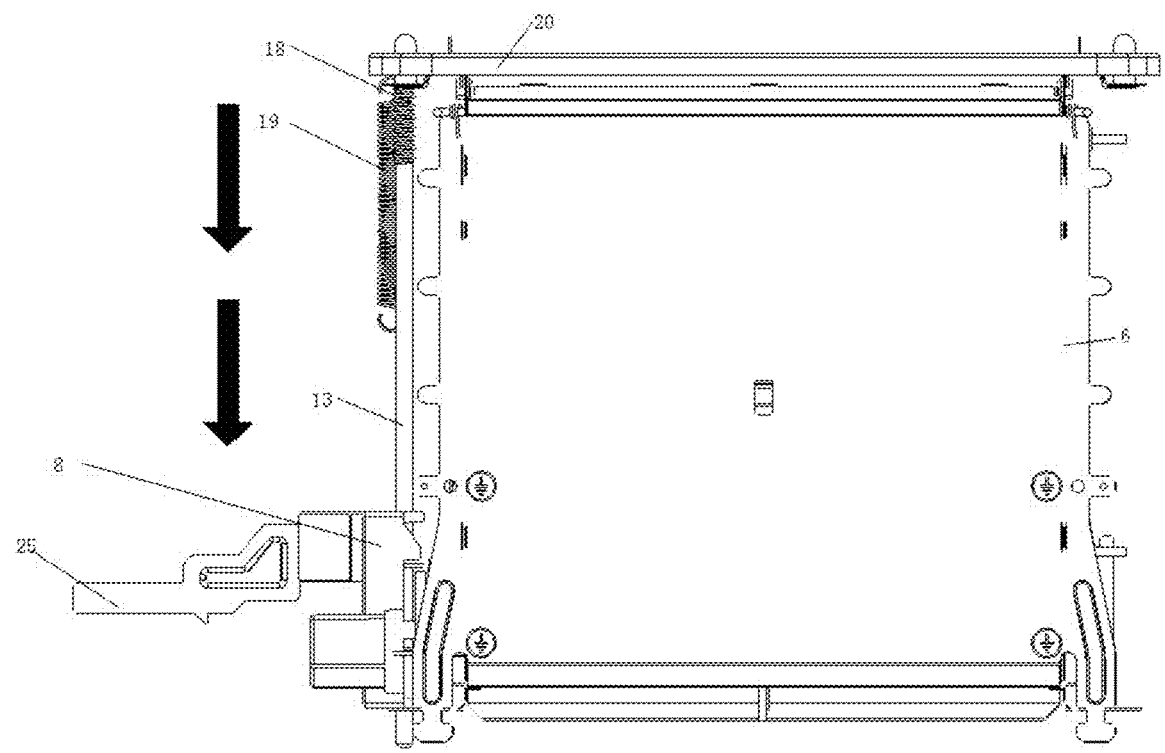
FIG. 7 is a side view illustrating the clamping working state of a handle for a contact baking mechanism of a toaster according to one embodiment of this invention.

The contact baking mechanism of the toaster of one embodiment of the present invention, as shown in FIG. 2, FIG. 3 and FIG. 4, in the non-working state, the mobile bracket 8 is located at the upper part of the front bracket 3, the left baking tray 1 and the right baking tray 2 are in the separate state, and the wire spring 11 and the tension spring 12 are in the relaxed state. As shown in FIG. 5, FIG. 6 and FIG. 7, putting the bread slice on the bread tray 7, moving down the flip handle 25, the return spring 19 is stretched, the mobile bracket 8 is moved down, the bread tray 7 is moved down, the end of the bread tray 7 compresses the wire spring 11 to deform and produce tension, the tension of the wire spring 11 drives the left baking tray 1 and the right baking tray 2 to move in the opposite direction along the moving hole of the hanging pin 17 to clamp the bread slice, at the same time, the tension spring 12 is compressed by the left baking tray 1 and the right baking tray 2. After heating, releasing the flip handle 25, the pull force of the return spring 19 causes the mobile bracket 8 to move up, the bread tray 7 to move up, at the same time, the wire spring 11 to relax, the push force of the tension spring 12 pushes the left baking tray 1 and the right baking tray 2 away, releasing the bread slice, and the bread slice moves up and out with the bread tray 7.

Figure 8:
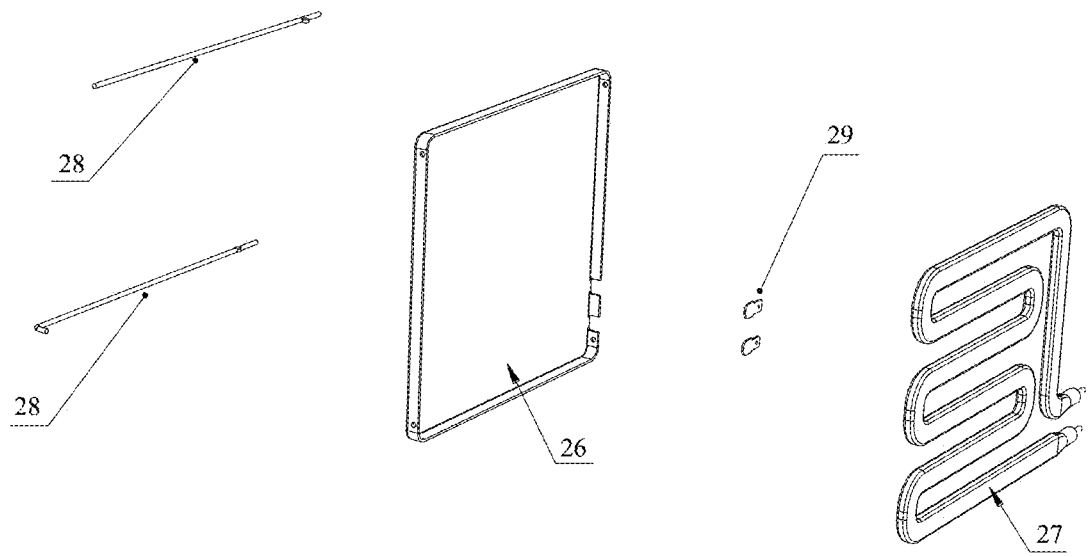
FIG. 8 is a schematic view illustrating the structure of a baking tray according to one embodiment of this invention.

Since the baking tray in the embodiment of the invention can move and contact with food directly, in order to ensure that the baking tray is easy to clean and the surface will not scale. As shown in FIG. 8, the left baking tray 1 and/or the right baking tray 2 can use the aluminum sheet 26 as the base material. The aluminum sheet 26 is sprayed with Teflon coating or ceramic coating on one side of the food, and the other side is brazed with the heating pipe 27. A terminal block 29 is provided on the two ends of the heating pipe 27. A support rod 28 is provided on the aluminum sheet 26, the support rod 28 is bent at the end to form a hanging pin 16.

Figure 9:
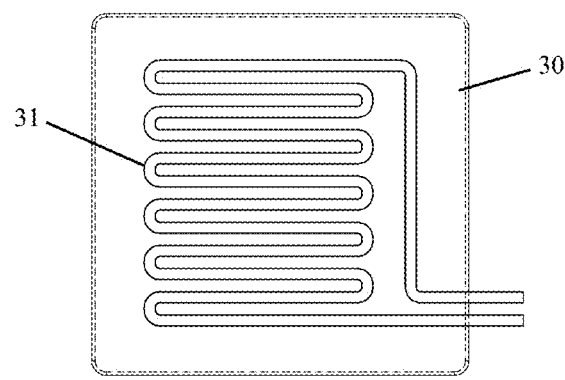
FIG. 9 is a schematic view illustrating the structure of another baking tray according to one embodiment of this invention.

In order to facilitate the movement of the baking tray, the baking tray in the embodiment of the invention further adopts the lightweight structure design, as shown in FIG. 9, the left baking tray 1 and/or the right baking tray 2 preferably adopts the glass ceramics 30 or the metal plate as the base material, and the glass ceramics or the metal plate 30 is printed with a febrile membrane 31 on one side of the food. The metal plate preferably adopts the high temperature resistant stainless steel plate, the steel plate or the iron plate. In order to prevent food adhesion, the metal plate facing the food can be sprayed with Teflon coating or ceramic coating.

In summary, the movable baking tray for direct contact baking in the present invention, which has high heating efficiency and energy saving; the structure is simple to using the spring to drive the baking tray to clamp the bread slice; compared with the fixed indirect non-contact baking, the time required for baking the bread slice is greatly shortened, the energy is saved, the evaporation of water in the bread slice is reduced, and the taste of the edible bread slice is improved.

While the present invention has been disclosed as above in preferred embodiments, it is not intended to limit the invention. Any person skilled in the art may make various improvement and modifications within the spirit and scope of the invention. Therefore, the scope of protection of the invention shall be subject to that defined in the claims.

What is claimed is:

1. A contact baking mechanism of a toaster, comprising two baking tray sets, a fixed bracket and a mobile mechanism, the two baking tray sets being provided in the fixed bracket, each of the baking tray sets comprising a left baking tray and a right baking tray, the mobile mechanism comprising two bread trays and a mobile bracket, the two bread trays being provided between the left baking tray and the right baking tray and clamped in the fixed bracket through a T-shaped groove, the mobile bracket being provided outside the fixed bracket and fixedly connected with the bread trays, wherein the left baking tray and the right baking tray are moved back and forth by an elastic mechanism when the bread trays move up and down along the T-shaped groove;

wherein each of the left and right baking trays includes a heating sheet that is configured to contact and heat a food product by a clamping force generated by the elastic mechanism;

wherein the clamping force is flexibly adjusted according to a thickness of the food product; and wherein the fixed bracket includes a front bracket, a back bracket, a left bracket and a right bracket, the front bracket and the back bracket are connected at the top by an upper bracket and at the bottom by a lower bracket, the left bracket and the right bracket are L-shaped, a guide groove perpendicular to the baking trays is provided between bottom ends of the lower bracket, the left bracket and the right bracket, a center of a bottom of each baking tray is provided with a guide post matched with the guide groove, and the each baking tray moves along the guide groove through the guide post.

2. The contact baking mechanism of a toaster of claim 1, wherein the baking trays are provided in parallel in the fixed bracket, the front bracket and the back bracket have the same structure and are provided symmetrically, the left bracket and the right bracket have the same structure and are provided symmetrically; the bread trays are clamped between the front bracket and the back bracket through the T shaped-groove, the bread trays are correspondingly provided with the baking trays, the mobile bracket is provided outside the front bracket, the elastic mechanism comprising a wire spring and a tension spring.

3. The contact baking mechanism of a toaster of claim 2, wherein a hanging pin is provided at both ends of top and bottom of the baking trays, a hole of the hanging pin matching with the hanging pin is provided on the front bracket and the back bracket, the hanging pin is provided in the hole of the hanging pin, one end of two staggered ends of the wire spring is fixed on the hanging pin on the top of the left baking tray, and the other end is fixed on the hanging pin on the right baking tray, the wire spring is clamped outside the front bracket or the back bracket through a pair of fixed buckles and a pair of buttress posts.

4. The contact baking mechanism of a toaster of claim 3, wherein the fixed buckles are symmetrically provided on both sides of the T-shaped groove, the buttress posts are symmetrically provided on both sides of the T-shaped groove and above the fixed buckles, the wire spring is pressed to deform and generate tension when the bread trays move downward.

5. The contact baking mechanism of a toaster of claim 3, wherein the tension spring is provided outside the front bracket or the back bracket, one end of the tension spring is fixed on the hanging pin of the left baking tray, and the other end is fixed on the hanging pin corresponding to the right baking tray.

6. The contact baking mechanism of a toaster of claim 2, wherein the heating sheet is an aluminum sheet, the aluminum sheet includes one side which faces the food and is sprayed with Teflon coating or ceramic coating and the other side that is brazed with a heating pipe which is provided with terminal blocks at two ends, and support rods are provided on the aluminum sheet, the support rods are bent at the end to form hanging pins.

7. The contact baking mechanism of a toaster of claim 2, wherein the heating sheet is made of glass ceramics or metal plate, a febrile membrane is printed on the glass ceramics or the metal plate, and the metal plate is sprayed with Teflon coating or ceramic coating on one side facing the food.

8. The contact baking mechanism of a toaster of claim 1, wherein a guide post is provided in the middle part of the outer side of the fixed bracket, the mobile bracket is clamped on the guide post, a limit spring is provided on the guide post, the limit spring is provided above the mobile bracket, a return spring is provided above the mobile bracket, one end of the return spring is fixed on the mobile bracket and the other end is fixed on the top of the front bracket.

9. The contact baking mechanism of a toaster of claim 1, wherein a flip handle is provided on the mobile bracket which is driven to move by the flip handle.

10. The contact baking mechanism of a toaster of claim 1, wherein a top cover is provided on the top of the fixed bracket, a bread entrance is provided at a corresponding position of the baking trays on the top cover.

11. A contact baking mechanism of a toaster, comprising:
two baking tray sets;
a fixed bracket; and
a mobile mechanism,
wherein the two baking tray sets are provided in parallel in the fixed bracket, and each baking tray set includes a left baking tray and a right baking tray; the fixed bracket includes a front bracket, a back bracket, a left bracket, and a right bracket, the front bracket and the back bracket have the same structure and are symmetrical with each other, and the left bracket and the right bracket have the same structure and are symmetrical with each other;
wherein the mobile mechanism includes two bread trays and a mobile bracket, each bread tray is provided between the left baking tray and the right baking tray and is clamped between the front bracket and the back bracket through a respective T-shaped groove, the mobile bracket is provided outside the front bracket of the fixed bracket and is attached to the bread tray, the left baking tray and the right baking tray are movable back and forth by an elastic mechanism when the bread trays move up and down along the respective T-shaped grooves, and the elastic mechanism includes a wire spring for each baking tray set;
wherein a first hanging pin is provided at both ends of a top and bottom of each of the left and right baking trays, a second hanging pin includes a moving hole which corresponds with the first hanging pin and is provided on the front bracket and the back bracket for the first hanging pin to extend therein, and one end of two staggered ends of the wire spring is fixed on the first hanging pin at the top of the left baking tray, and the other end is fixed on the first hanging pin at the right baking tray;
wherein the wire spring is clamped outside the front bracket or the back bracket through a pair of fixed buckles and a pair of buttress posts which are above the fixed buckles;
wherein each of the pair of fixed buckles and each of the pair of buttress posts are symmetrically provided on both sides of the T-shaped groove, and the wire spring is pressed to deform and generate tension when the bread trays move downward;
wherein the elastic mechanism further includes a tension spring for each baking tray set, the tension spring being provided outside the front bracket or the back bracket, one end of the tension spring is fixed on the first hanging pin of the left baking tray, and the other end is fixed on the first hanging pin corresponding to the right baking tray, the mobile bracket is movable from a non-working state, in which the mobile bracket is located at an upper part of the front bracket, the left baking tray and the right baking tray are in a separate state, and the wire spring and the tension spring are in a relaxed state, to a working state, whereby the mobile bracket is moved down, the bread tray is moved down, the end of the bread tray compresses the wire spring to deform and produce tension, the tension of the wire spring drives the left baking tray and the right baking tray to move in the opposite direction along the moving hole of the second hanging pin to clamp a bread slice, at the same time, the tension spring is compressed by the left baking tray and the right baking tray;
wherein each of the left and right baking trays comprises a base plate for directly contacting food to be toasted and a heating element for heating the base plate, the base plate including a food-contacting side and an opposing side;
wherein the base plate is an aluminium sheet sprayed with polytetrafluoroethylene (Teflon) or ceramic coating on the food-contacting side and the heating element is a heating pipe brazed on the opposing side of the base plate, or the base plate is a glass ceramics plate or a metal plate and the heating element is a febrile membrane printed on the opposing side of the base plate.

12. The contact baking mechanism of a toaster of claim 11, wherein the front bracket and the back bracket are connected at the top by an upper bracket and at the bottom by a lower bracket, the left bracket and the right bracket re L-shaped, a guide groove perpendicular to the baking tray sets is provided between bottom ends of the lower bracket, the left bracket and the right bracket, a center of a bottom of each baking tray set is provided with a guide post matched with the guide groove, and each baking tray set moves along the guide groove through the guide post.

13. The contact baking mechanism of a toaster of claim 11, wherein a guide post is provided in the middle part of the outer side of the fixed bracket, the mobile bracket is clamped on the guide post, a limit spring is provided on the guide post, the limit spring is provided above the mobile bracket, a return spring is provided above the mobile bracket one end of the return spring is fixed on the mobile bracket and the other end is fixed on the top of the front bracket.

14. The contact baking mechanism of a toaster of claim 11, wherein a flip handle is provided on the mobile bracket which is driven to move by the flip handle.

15. The contact baking mechanism of a toaster of claim 11, wherein a top cover is provided on the top of the fixed bracket, a bread entrance is provided at the corresponding position of the baking trays on the top cover.

16. The contact baking mechanism of a toaster of claim 11, wherein the heating pipe is provided with terminal blocks at two ends, and support rods are provided on the aluminum sheet, ends of the support rods are bent to form hanging pins.

17. The contact baking mechanism of a toaster of claim 11, wherein the metal plate is sprayed with a Teflon coating or ceramic coating on the food-contacting side of the base plate.

\* \* \* \* \*